United States Patent Office 3,589,911

Patented June 29, 1971

1

3,589,911

PRESSURE ROASTING OF COFFEE BEANS

Herman H. Friedman, Bayside, N.Y., assignor to General Foods Corporation, White Plains, N.Y.

No Drawing. Filed Feb. 7, 1968, Ser. No. 703,525
Int. Cl. A23f *1/02*
U.S. Cl. 99—68 3 Claims

ABSTRACT OF THE DISCLOSURE

Coffee is roasted at pressures of about 1000 p.s.i.g., or above, in the presence of an atmosphere having a lowered oxygen content.

BACKGROUND OF THE INVENTION

The roasting of coffee is carried out to improve and develop its flavor, color, and acidity. Conventionally, coffee is roasted at atmospheric pressure at temperatures above about 230° F. The particular roasting temperatures and times vary with the particular variety of coffee being treated and with the desired final color of the roasted coffee.

The conventional roasting of coffee develops certain undesirable flavor characteristics, among which are harsh, phenolic, smokey and tarry flavor notes, and an unpleasant acidity. Moreover, up to about 15% by weight of the coffee, based on pre-roasting weight is lost during roasting.

While it has been suggested to roast coffee at moderately elevated pressures, the flavor characteristics and the roasting losses of coffee roasted at moderately elevated pressures do not differ from those of conventional atmospherically roasted coffee.

OBJECTS OF THE INVENTION

It is, therefore, an object of the present invention to provide a method for roasting coffee which overcomes the disadvantages of prior art roasting methods. Another object is to provide a method for roasting coffee which produces coffee having improved flavor characteristics. A further object is to provide a method for reducing undesirable flavor notes in coffee. Yet another object is to provide a method for roasting coffee which provides more soluble solids. A further object is to reduce roasting losses.

SUMMARY OF THE INVENTION

It has now been found that the disadvantages of conventional atmospheric roasting or of moderately low pressure roasting are overcome, and coffee having improved flavor characteristics and a greater quantity of soluble solids is obtained by roasting coffee at high pressures in an atmosphere having a lowered oxygen content.

DETAILED DESCRIPTION OF THE INVENTION

The high pressure employed according to the present invention should be at least about 1,000 p.s.i.g. and preferably at least about 1,500 p.s.i.g. Most preferably the pressures are above about 1,750 p.s.i.g. The roasting takes place in an atmosphere having a lowered oxygen content, preferably below about 10% by volume. Most preferably, oxygen is substantially excluded, and an inert atmosphere is employed. The inert atmosphere may consist of carbon dioxide, nitrogen, helium, neon, argon, or krypton, or mixtures of any two or more of the foregoing materials in any ratios.

According to the method of the present invention, the coffee beans, either whole or ground, are pressurized and heated at suitable roasting temperature and for suitable times for the particular variety of coffee being treated. The roasting temperatures are in the range of from about 275° F. to about 425° F. Preferably, the roasting temperatures employed will be in the range of from about 300° F.

2 to about 390° F. The roasting time may vary from less than a minute up to about 30 minutes.

The coffee roasted by the method of the present invention is characterized a sizable reduction in such undesirable flavor characteristics as harsh, phenolic, smokey and tarry flavor notes present in conventionally roasted coffee; it has less roasting loss and a higher amount of soluble solids.

The following examples illustrate the present invention without, however, limiting the same thereto.

EXAMPLE 1

450 grams of green beans (Ivory Coast Robustas) are placed in an autoclave. Carbon dioxide is introduced, with an initial displacement of the air, and the vessel sealed. The pressure is increased to 1,000 p.s.i.g. using carbon dioxide gas and heat applied with continuous stirring of the beans until the temperature has reached 370° F. At this point, the pressure is at 2,000–2,200 p.s.i.g. The vessel is immediately removed from the heating chamber and the valve opened to release the pressure. When the autoclave has reached atmospheric pressure (usually 1.0–1.5 minutes), the contents are removed and permitted to cool to room temperature at which time, the roasted beans are vacuum canned for flavor protection. The roast color is about 50.

EXAMPLE 2

450 grams of green beans (Ivory Coast Robustas) are placed in an autoclave and treated as in Example 1. The final temperature is 360° F. and the pressure at this temperature is 2,000 p.s.i.g. The roast color is 58.

The products of each of the foregoing examples are characterized by a pleasant acidity and complete lack of the undesirable phenolic, tarry character of normally roasted Robustas beans, and by a higher percentage of soluble solids.

While the present invention has been described in detail, it will be understood by those skilled in the art that variations and modifications may be made without departing from the spirit thereof or the scope of the following claims.

What is claimed is:

1. In a process for roasting whole green coffee beans, the improvement comprising roasting the coffee in a chamber heated vessel at pressures above 1000 p.s.i.g. in an atmosphere substantially free of oxygen and consisting essentially of carbon dioxide introduced into said vessel; the roasting temperature being from about 275° F. to about 425° F. and the roasting time being from about 1 minute to about 30 minutes.

2. A process according to claim 1 wherein the pressure is at least about 1,500 p.s.i.g.

3. A process according to claim 1 wherein the pressure is at least 1,750 p.s.i.g.

References Cited

UNITED STATES PATENTS

| | | | |
|---|---|---|---|
| 2,278,473 | 4/1942 | Musher | 99—680X |
| 2,444,217 | 6/1948 | Armentrout | 99—68 |
| 2,292,255 | 8/1942 | Weisberg | 99—68 |
| 2,569,217 | 9/1951 | Bagdigian | 99—68 |
| 3,328,172 | 6/1967 | Smith | 99—68 |
| 3,106,470 | 10/1963 | Spotholz | 99—65X |

FRANKLIN W. LUTTER, Primary Examiner

R. HALPER, Assistant Examiner

U.S. Cl. X.R.

99—236